United States Patent [19]
Kerr

[11] 3,799,678
[45] Mar. 26, 1974

[54] POSITION MEASURING DEVICE

[75] Inventor: Andrew Guy Kerr, Edinburgh, Scotland

[73] Assignee: Ferranti Limited, Hollinwood, Lancashire, England

[22] Filed: May 31, 1972

[21] Appl. No.: 258,264

[52] U.S. Cl. .................... 356/169, 33/1 M, 33/25 R
[51] Int. Cl. ............................................. G01b 11/04
[58] Field of Search ....... 33/25 R, 25 B, 25 C, 25 E, 33/1 M; 356/169

[56] References Cited
UNITED STATES PATENTS
2,886,718  5/1959  Shepherd et al. .................. 356/169
2,857,802  10/1958  Cail .................................. 356/169

FOREIGN PATENTS OR APPLICATIONS
886,621  1/1962  Great Britain ..................... 33/25 R OTHER PUBLICATIONS
Hunt, Abstract of Serial No. 51,781, filed 9/29/48, Published in Vo. 646 O. G. 5/1/51, on pg. 323.

Primary Examiner—Ronald L. Wibert
Assistant Examiner—Paul K. Godwin
Attorney, Agent, or Firm—Cameron, Kerkam, Sutton, Stowell & Stowell

[57] ABSTRACT

A position indicating device includes a pantograph linkage employed to reduce the scale of the displacement of a first point on the pantograph to a corresponding displacement of a second point on the pantograph. The displacement of the second point is measured with respect to two co-ordinate axes by accurate means such as interference fringes produced by relative movement between optical diffraction gratings to give an accurate indication of the large scale movement of the first point. Means is provided to maintain the relative orientation of the diffraction gratings to produce interference fringes for all movements of the second point.

6 Claims, 1 Drawing Figure

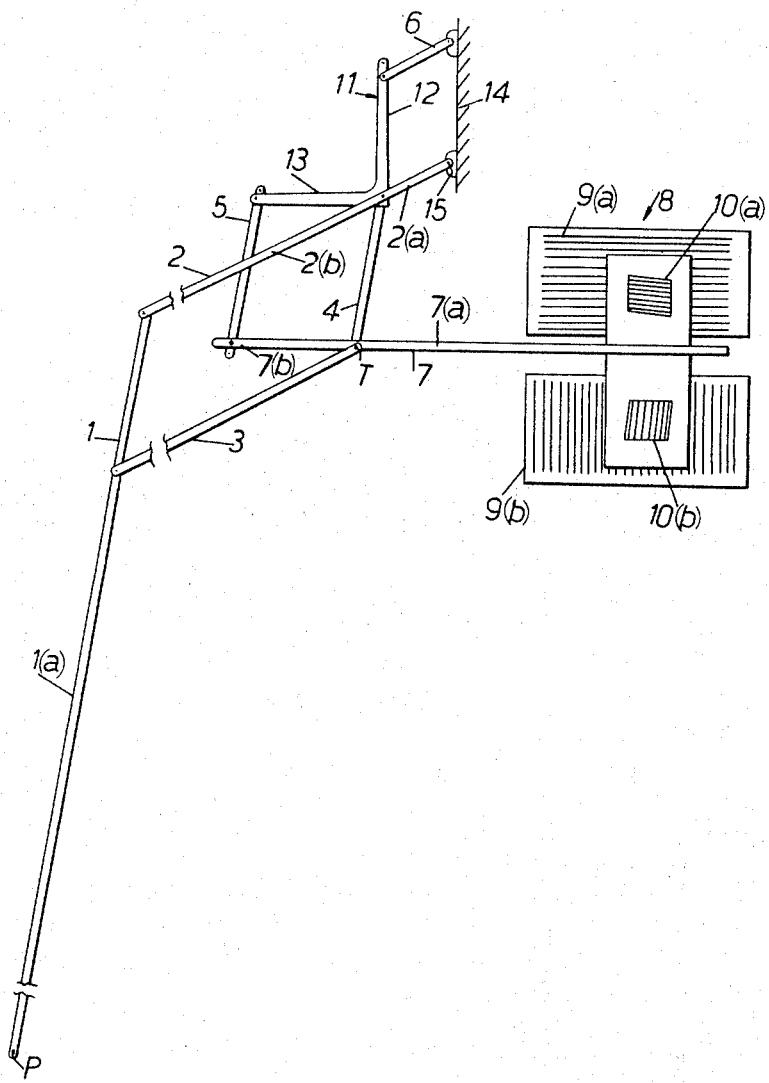

POSITION MEASURING DEVICE

This invention relates to position-indicating devices and in particular to devices which indicate a point in a specified area in terms of co-ordinate axes. In the past, devices have been made which measure distances and indicate positions within a usually rectangular area in terms of Cartesian co-ordinates, employing scales mounted along the length of two adjacent sides of the area and/or on carriages movable over the area. Such a device is shown in our U.S. Pat. NO. 3,394,248 and employs optical diffraction gratings, one mounted on a reference surface and a second mounted to move along the first grating with the grating lines at a small angle from parallel to give an interference fringe pattern, movement of the interference fringes giving a measurement of the distance moved by one grating along the other.

However, these devices require measuring scales equal in length to the sides of the area over which measurements are made, and if optical diffraction gratings are employed expensive lengths of grating are required.

It is an object of the present invention to provide a position-indicating device operable to give an accurate indication of the position of a point and employing inexpensive measuring means.

According to the present invention, a position-indicating device includes a pantograph linkage comprising four rigid members freely jointed in the form of a parallelogram wherein displacement of a first point on the linkage is translated into a corresponding displacement of a second point on the linkage on a reduced scale, and apparatus for measuring the magnitude of a displacement of the second point including a part pivotally connected to the second point for displacement thereby and means for constraining movement of the part so that the part is maintained in a predetermined orientation of two co-ordinate axes.

The co-ordinate axes may be perpendicular to each other.

Conveniently the measuring means comprises moveable optical diffraction gratings caused to move relative to fixed optical diffraction gratings.

It is advantageous if the means for constraining movement of said part of the apparatus comprises a linkage of members arranged in the form of first and second freely jointed parallelograms, one side of the first parallelogram being fixed in relation to the co-ordinate axes, one side of the second parallelogram being rigidly attached to said part and containing said second point, and the side opposite to said one side of the first parallelogram and the side opposite to said one side of second parallelogram being constrained in a predetermined angle to each other.

The fixed angle may be a right-angle.

It is also advantageous if one of the members interconnecting said opposite sides of each of said first and second parallelograms is common with the pantograph linkage.

The device also provides means for measuring small distances of the order of thousandths of an inch, across an area several feet square. By a suitable reduction ratio for the pantograph, not necessarily the same for both axes, the second point may be reduced to a travel of inches, a length convenient for the employment of a diffraction grating.

The type of diffraction grating used, and the method by which information is sensed and processed forms no part of this invention and may be of the form described in U.S. Pat. No. 2,886,717 or U.S. Pat. No. 2,886,718.

Co-ordinate output information may be recorded on magnetic or punched paper tape or photographic film and used in a numerically controlled machine tool or stored for reproduction purposes. Direct measurement of a distance travelled by the first point could easily be achieved by "reconstituting" the measured co-ordinates to give a direct read-out.

In the accompanying schematic drawing an embodiment of the invention employing optical diffraction grating measuring means is described.

The pantograph linkage comprising members 1, 2, 3 and 4 is a prallelogram with the member 1 including an extended portion as 1(a) and the member 2 including an extended portion as 2(a). The linkage is pivoted about the end of 2(a) at 15 and performs the action of a conventional pantograph in that motion of the first point P, at the extremity of portion 1(a) of member 1, causes a reduced scale following of a second point T, the junction of members 3 and 4. The path traced out by the point T is reduced in size in the ratios of length of member 4: length of member 1 and length of member portion 2(a): length of member 2; both ratios are conveniently 1:20.

A part 7 comprising portions 7(a) and 7(b) passes through and is pivoted at the point T.

The apparatus for measuring the magnitude of a displacement of the second point T is indicated generally at 8 and is located at the end of the portion 7(a) remote from the pantograph. The measuring apparatus has first optical diffraction gratings 9(a) and 9(b), mounted on the body of the device and second optical diffraction gratings 10(a) and 10(b), mounted on the portion 7(a) of the part 7 so as to over-lay and be moveable in relation to the fixed gratings 9(a) and 9(b).

The fixed gratings 9(a) and 9(b) are mounted on the body of the device such that the grating lines are mutually perpendicular. Each of the gratings 10(a) and 10(b) has its grating lines generally parallel to the grating which it overlays but skewed slightly in relation thereto in order to establish a fringing effect on light passing through the gratings.

Although each grating provides only a measurement of the distance moved over the length of its corresponding fixed grating 9 in one direction, the width of the grating must be such that the grating 10 still overlays the fixed grating throughout the range of travel of the part 7 in the orthogonal direction.

The linkage formed by members 2(a), 6, 4, 5 and angle-member 11 ensures that the part 7 only moves parallel and perpendicular to its own length and does not rotate about the the Point T, thus maintaining the orientation between the gratings 9 and 10 and permitting the formation of interference fringes.

The angle between limbs 12 and 13 of angle-member 11 is a right-angle. The limb 12 of the angle-member 11 is constrained by members 6 and 2(a) into forming a parallelogram with them and a surface 14 of the body of the device and remaining parallel to that surface. The limb 13 of angle-member 11 must therefore remain perpendicular to the surface 14 and forms, with members 4, 5 and the portion 7(b) of part 7, a further parallelogram, constraining the part 7 to remain parallel to the limb 13, that is, perpendicular to the surface 14.

The part 7 is thus able to move parallel to surface 14 by virtue of the fixed relationship with member 11 and is able to move perpendicular to the surface 14 by motion relative to the member 11, but is unable to rotate relative to the surface 14. The members 2(a) and 4 are common to the pantograph and the orientation maintaining linkage, as is pivot point 15.

Employing a pantograph with a 20 : 1 reduction ratio, an area of, say, 4 feet square is measurable with fixed grating lengths of 2½ inches. With such a length of grating, it is practicable to use line separations of better than 1/5000 inch which will measure movement to better than 0.0002 inch for the point T and $20 \times 0.0002$, that is, 0.004 inch for the point P.

It is therefore, possible to resolve measurements in rectangular Cartesian co-ordinates over a given area to 0.004 inch in 4 feet, or approximately, to one part in $10^4$. To make full use of the accuracy afforded by the use of diffraction gratings, it is essential that the joints between the members be accurately located and free from any "lost-motion". From practical considerations, it is easier to construct a pantograph-type linkage, as described, with accurate relatively moving members than to construct a rectilinear carriage-type device requiring sliding bearings, notwithstanding the more economical use of gratings.

Several variations are possible in the arrangement of the device. For instance, the point T and the pivot point 15 could be interchanged in which case a displacement of the point T would be in the opposite direction to a displacement of the point P. The co-ordinates need not be Cartesian, although a computer would be required to interpret the readings. Also, the angle between the limbs 11 and 13 of the member 12 need not be a right-angle, but may be any fixed angle, even with the measuring scales mutually perpendicular.

What I claim is:

1. A position measuring device including a pantograph linkage comprising four rigid members freely jointed in the form of a parallelogram wherein displacement of a first point on the linkage is translated into a corresponding displacement of a second point on the linkage on a reduced scale, and apparatus for measuring the magnitude of a displacement of the second point including a part pivotally connected to the second point for displacement thereby and means for constraining movement of the part so that the part is maintained in a predetermined orientation to two co-ordinate axes.

2. A position measuring device as claimed in claim 1 in which the co-ordinate axes are perpendicular to each other.

3. A position measuring device as claimed in claim 1 in which the apparatus for measuring the magnitude of a displacement of the second point also includes first optical diffraction gratings fixed individually in relation to each of said co-ordinate axes and second optical diffraction gratings fixed to said part of the apparatus and movable relative to and in operable relationship with said first gratings.

4. A position measuring device as claimed in claim 1 in which the means for constraining movement of said part of the apparatus comprises a linkage of members arranged in the form of first and second freely jointed parallelograms, one side of the first parallelogram being fixed in relation to the co-ordinate axes, one side of the second parallelogram being rigidly attached to said part and the side opposite to said one side of the first parallelogram and the side opposite to said one side of the second parallelogram being constrained at a predetermined angle to each other.

5. A position measuring device as claimed in claim 4 in which the predetermined angle is a right-angle.

6. A position measuring device as claimed in claim 4 in which one of the members interconnecting said opposite sides of each of said first and second parallelograms is common with the pantograph linkage.

* * * * *

UNITED STATES PATENT OFFICE
CERTIFICATE OF CORRECTION

Patent No. 3,799,678                Dated March 26, 1974

Inventor(s) Andrew Guy Kerr

It is certified that error appears in the above-identified patent and that said Letters Patent are hereby corrected as shown below:

On the cover page, insert --Foreign Priority Information - British Application No. 18325/71 filed June 1, 1971--.

Signed and sealed this 30th day of July 1974.

(SEAL)
Attest:

McCOY M. GIBSON, JR.              C. MARSHALL DANN
Attesting Officer                 Commissioner of Patents